US008557468B2

(12) United States Patent
Hilmi et al.

(10) Patent No.: US 8,557,468 B2
(45) Date of Patent: Oct. 15, 2013

(54) HIGH PERFORMANCE ELECTROLYTE FOR MOLTEN CARBONATE FUEL CELLS COMPRISING CARBONATE ELECTROLYTE DOPED WITH ADDITIVE MATERIAL(S) AND LITHIUM PRECURSOR(S)

(75) Inventors: Abdelkader Hilmi, Bethel, CT (US); Chao-Yi Yuh, New Milford, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 443 days.

(21) Appl. No.: 12/840,736

(22) Filed: Jul. 21, 2010

(65) Prior Publication Data

US 2012/0021328 A1   Jan. 26, 2012

(51) Int. Cl.
*H01M 8/00* (2006.01)
*H01M 8/04* (2006.01)

(52) U.S. Cl.
USPC ............ 429/478; 429/517; 429/523; 429/535

(58) Field of Classification Search
USPC .......... 429/478, 442, 516, 110, 535, 517, 523
See application file for complete search history.

(56) References Cited

U.S. PATENT DOCUMENTS

| | | | | |
|---|---|---|---|---|
| 4,591,538 | A * | 5/1986 | Kunz | 429/464 |
| 5,399,443 | A * | 3/1995 | Ong et al. | 429/535 |
| 5,869,203 | A * | 2/1999 | Huang et al. | 429/475 |
| 5,942,345 | A | 8/1999 | Kaun et al. | |
| 2002/0164522 | A1* | 11/2002 | Huang et al. | 429/44 |
| 2006/0257722 | A1 | 11/2006 | Hilmi et al. | |
| 2006/0269830 | A1* | 11/2006 | Johnsen et al. | 429/46 |
| 2008/0032183 | A1* | 2/2008 | Xu et al. | 429/46 |
| 2008/0160181 | A1 | 7/2008 | Ryu et al. | |

FOREIGN PATENT DOCUMENTS

| | | |
|---|---|---|
| DE | 10136156 A1 | 11/2002 |
| JP | 60-012671 A | 1/1985 |
| JP | 2003-007315 A | 1/2003 |

OTHER PUBLICATIONS

Machine Translation of: DE 10136156A, Hoffman, Nov. 7, 2002.*
T. Kojima et al., The Surface Tension and the Density of Molten Binary Alkali Carbonate Systems, Journal: Denki Kagaku oyobi Kogyo Butsuri Kagaku, (1999) vol. 67, No. 6, pp. 593-602 (ISSN: 1344-3542).
D. Scott Smith et al., Cesium-Containing Electrolyte for the Molten Carbonate Fuel Cell, Electrochem. Solid-State Lett., (1999) vol. 2, Issue 5, pp. 207-209, Published Feb. 12, 1999.
Stefano Frangini et al., The Dissolution of Oxygen in La2O3-Added 52/48 mol % Li/Na Molten Carbonate Determined by Gas Solubility Measurements, J. Electrochem. Soc., (2005) vol. 152, Issue 11, pp. A2155-A2158, Published Sep. 21, 2005.
K. Matsuzawa et al., The effect of La oxide additive on the solubility of NiO in molten carbonates, Journal of Power Sources, (2005) vol. 140, No. 2, pp. 258-263.
The International Search Report of International Application No. PCT/US2011/043952 issued on Mar. 28, 2012.

* cited by examiner

*Primary Examiner* — Kenneth Douyette
(74) *Attorney, Agent, or Firm* — Cowan, Liebowitz & Latman, P.C.

(57) ABSTRACT

A high-performance carbonate electrolyte for use in a molten carbonate fuel cell comprising a cathode electrode, an anode electrode, an electrolyte matrix and at least a cathode current collector abutting said cathode electrode, the high-performance carbonate electrolyte comprising: a first carbonate electrolyte stored in at least the cathode electrode of the molten carbonate fuel cell comprising a mixture of eutectic Li/Na carbonate electrolyte doped with one or more additive materials and one or more lithium precursors, wherein the additive materials include one or more of $Rb_2CO_3$, $Cs_2CO_3$, $BaCO_3$, $La_2O_3$, $Bi_2O_3$, $Ta_2O_5$ and mixtures thereof, and a second carbonate electrolyte stored in at least the cathode current collector, the second carbonate electrolyte having a composition that is the same or different from the first carbonate electrolyte.

39 Claims, 5 Drawing Sheets

HIGH PERFORMANCE ELECTROLYTE FOR MOLTEN CARBONATE FUEL CELLS COMPRISING CARBONATE ELECTROLYTE DOPED WITH ADDITIVE MATERIAL(S) AND LITHIUM PRECURSOR(S)

BACKGROUND OF THE INVENTION

This invention relates to fuel cells and, in particular, to an improved electrolyte for use in molten carbonate fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Molten carbonate fuel cells (MCFCs) operate by passing a reactant fuel gas through the anode, while oxidizing gas is passed through the cathode. The anode and the cathode of MCFCs are isolated from one another by a porous electrolyte matrix which is saturated with carbonate electrolyte. Typical MCFC designs include carbonate electrolyte stored in the pores of the anode and of the cathode and in gas passages formed in the anode and cathode current collectors. Generally MCFCs operate at intermediate temperatures of 575° C.-670° C., and the electrolyte melts during the initial heat up of the fuel cell and redistributes among the pores of the anode, the cathode and the electrolyte matrix due to the capillary forces of the pores. Conventional MCFCs typically use a eutectic carbonate mixture as the carbonate electrolyte, such as a eutectic mixture of 62 mol-% lithium carbonate and 38 mol-% potassium carbonate (62% $Li_2CO_3$/38% $K2CO_3$) or a eutectic mixture of 52 mol-% lithium carbonate and 48 mol-% sodium carbonate (52% $Li_2CO_3$/48% $Na_2CO_3$).

It is generally recognized that the Li/Na carbonate mixtures have higher ionic conductivity, lower vapor pressure and cause lower cathode dissolution, than the Li/K carbonate mixtures. However, a major disadvantage of the Li/Na carbonate mixtures is a lower oxygen gas solubility, which significantly affects the performance of fuel cells at lower temperatures (T<600° C.). That is, fuel cells using the 52% $Li_2CO_3$/48% $Na_2CO_3$ electrolyte exhibit lower performance than the fuel cells using 62% $Li_2CO_3$/38% $K_2CO_3$ electrolyte due to high cathode polarization which is caused by low oxygen solubility, particularly at lower operating temperatures. As a result, in order to effectively use Li/Na carbonate electrolyte at MCFCs, the performance of the Li/Na carbonate electrolyte needs to be improved at low operating temperatures of T<620° C. and the surface tension of the electrolyte needs to be reduced so as to improve gas solubility therein.

It has been reported in literature that the addition of certain additives that include Rb and/or Cs to the carbonate melt lowers its surface tension because the Rb and Cs ions are larger than the Li and Na ions and thus Rb and Cs act as surfactant to decrease the surface tension of the Li/Na carbonate electrolyte and to improve gas solubility. In addition, DE10136156 to Hoffman Joachim discloses use of Li/Na/Cs, Li/K/Cs, Li/Na/Rb or Li/K/Rb or mixtures thereof as electrolytes for MCFS, and that the use of the Li/Na/Cs electrolyte, formed by mixing 52% Li/48% Na and 70% Li/30% Cs carbonates, improved the performance of the cathode at 650° C. due to low polarization over the performance of the eutectic 62% Li/38% K carbonate electrolyte. Applicants in the present invention performed tests on cells that used the 52% Li/48% Na carbonate electrolyte doped with Cs and/or Rb as disclosed in the DE10136156 patent, and found that these cells exhibited lower performance at lower temperatures T<620° C. than fuel cells using 62% Li/38% K carbonate electrolyte, because of high cathode loss and high mass transfer resistance.

U.S. Pat. No. 5,942,345 discloses that Li/Na carbonate electrolyte doped with small amounts of $CaCO_3$ and $BaCO_3$, preferably in equimolar amounts, provides better performance than the eutectic 52% Li/48% Na mainly at low temperature. However, when Li/Na carbonate electrolytes doped with $BaCO_3$ and $CaCO_3$ were tested by applicants in button cells (3 $cm^2$), the addition of the Ba and Ca additives only showed a minor effect on the performance of the cathode, and the overall cell performance at low temperatures of T<600° C. remained lower than that of fuel cells using Li/K carbonate electrolyte. In particular, button cell tests showed that the cathode polarization in cells with Li/Na carbonate electrolytes doped with Ba and Ca was two times higher than cathode polarization in cells using Li/K carbonate electrolyte. In addition, applicants' tests performed in single cells (250 $cm^2$) with Li/Na/Ba/Ca carbonate electrolytes showed low performance at T<600° C. due to high cathode polarization.

It is therefore an object of the present invention to provide an improved Li/Na carbonate electrolyte for use in MCFCs that has improved performance over the Li/K carbonate electrolyte at low MCFC operating temperatures of T<620° C.

In particular, it is an object of the present invention to provide an improved Li/Na carbonate electrolyte that has lower surface tension and improved gas solubility and that reduces polarization of the cathode at low MCFC operating temperatures of T<620° C.

It is also an object of the present invention to provide a method of storing the improved electrolyte in the fuel cell components so as to provide for the improved performance.

SUMMARY OF THE INVENTION

In accordance with the principles of the present invention, the above and other objectives are realized a high-performance carbonate electrolyte for use in a molten carbonate fuel cell comprising a cathode electrode, an anode electrode, an electrolyte matrix and at least a cathode current collector abutting said cathode electrode, the high-performance carbonate electrolyte comprising: a first carbonate electrolyte stored in at least the cathode electrode of the molten carbonate fuel cell comprising a mixture of eutectic Li/Na carbonate electrolyte doped with one or more additive materials and one or more lithium precursors, wherein the additive materials include one or more of $Rb_2CO_3$, $Cs_2CO_3$, $BaCO_3$, $La_2O_3$, $Bi_2O_3$, $Ta_2O_5$ and mixtures thereof, and a second carbonate electrolyte stored in at least the cathode current collector, the second carbonate electrolyte having a composition that is the same or different from the first carbonate electrolyte. In certain embodiments, at least 60 wt % of the total electrolyte amount, including first and second carbonate electrolyte, is stored in the cathode electrode, and at least 90 wt % of the first carbonate electrolyte is stored in the cathode electrode. In particular, 60-70 wt % of the total electrolyte amount is stored in the cathode electrode and 90-100 wt % of the first carbonate electrolyte is stored in the cathode electrode. The one or more lithium precursors include one or more of LiOH, $Li_2CO_3$, $LiNO_3$, lithium acetate and lithium oxalate. In some embodiments, the second carbonate has a different composition from the first carbonate electrolyte and the second carbonate electrolyte comprises one of a eutectic mixture of $Li_2CO_3$ and $Na_2CO_3$ and an off-eutectic mixture of $Li_2CO_3$ and $Na_2CO_3$.

In some illustrative embodiments, the first carbonate electrolyte comprises between 65 wt % and 85 wt % of the eutectic Li/Na electrolyte doped with one or more additive materials and between 15 wt % and 35 wt % of the one or more lithium precursors, the doped eutectic Li/Na electrolyte comprising between 93 mol % and 99.5 mol % of the eutectic mixture of 52 mol % of $Li_2CO_3$ and 48 mol % of $Na_2CO_3$ and between 0.5 mol % and 7 mol % of the one or more additive materials and the second carbonate electrolyte comprises the eutectic mixture of the $Li_2CO_3$ and $Na_2CO_3$. In other illustrative embodiments, the first carbonate electrolyte comprises between 92 wt % and 99 wt % of the eutectic Li/Na electrolyte doped with one or more additive materials and between 1 wt % and 8 wt % of the one or more lithium precursors, the doped eutectic Li/Na electrolyte comprises between 93 mol % and 99.5 mol % of the eutectic mixture of 52 mol % $Li_2CO_3$ and 48 mol % $Na_2CO_3$ and between 0.5 mol % and 7 mol % of the one or more additive materials; and the second carbonate electrolyte comprises the off-eutectic mixture of $Li_2CO_3$ and $Na_2CO_3$ comprising 80 mol % or more of $Li_2CO_3$ and 20 mol % or less of $Na_2CO_3$. In yet other embodiments, the first and second carbonate electrolytes have the same composition and comprise between 65 wt % and 94 wt % of said eutectic Li/Na electrolyte doped with said one or more additive materials and between 6 wt % and 35 wt % of said one or more lithium precursors, said doped eutectic Li/Na electrolyte comprises between 93 mol % and 99.5 mol % of said eutectic mixture of 52 mol % $Li_2CO_3$ and 48 mol % $Na_2CO_3$ and between 0.5 mol % and 7 mol % of said one or more additive materials.

The above objectives are also realized by a high-performance carbonate electrolyte for use in a molten carbonate fuel cell comprising a cathode electrode, an anode electrode, an electrolyte matrix and at least a cathode current collector abutting said cathode electrode, the high-performance carbonate electrolyte comprising at least a first carbonate electrolyte stored in at least the cathode electrode of the molten carbonate fuel cell and comprising a mixture of Li/Na carbonate electrolyte doped with one or more additive materials and one or more lithium precursors, wherein the additive materials include one or more of $Bi_2O_3$, $Ta_2O_5$ and a mixture of Ba and Cs. In some embodiments, the high-performance carbonate electrolyte also comprises a second carbonate electrolyte stored in at least the cathode current collector, the second carbonate electrolyte having a composition that is the same or different from the first carbonate electrolyte.

A molten carbonate fuel cell assembly using the above described high-performance carbonate electrolytes and a method of manufacturing a molten carbonate fuel cell assembly with the above high-performance carbonate electrolytes are also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
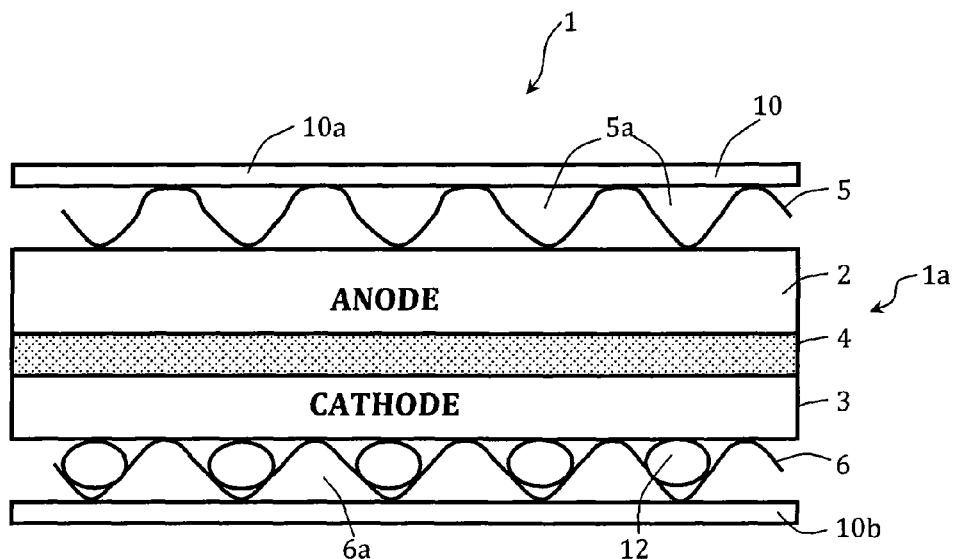
FIG. 1 shows a cross-sectional view of a fuel cell assembly having fuel cells using a high-performance Li/Na carbonate electrolyte in accordance with the principles of the present invention.

FIG. 1 shows a cross-sectional view of a portion of a fuel cell assembly 1. As shown, the fuel cell assembly 1 includes a fuel cell 1a comprising an anode electrode 2 and a cathode electrode 3 separated by an electrolyte matrix 4. The fuel cell 1a also includes an anode current collector 5 and a cathode current collector 6 which form gas passages 5a, 6a for fuel gas and oxidant gas, respectively. In the illustrative example shown in FIG. 1, the anode current collector 5 and the cathode current collector 6 are corrugated current collectors. The fuel cell assembly 1 includes one or more such fuel cells 1a stacked in series so as to form a fuel cell stack. The fuel cell assembly 1 also includes a plurality of bipolar separator plates 10 for separating adjacent fuel cells of the assembly from one another. In FIG. 1, the bipolar separator plate 10a separates the anode 2 and the anode current collector 5 of the fuel cell 1a from a fuel cell adjacent the anode side of the cell 1a, while the bipolar separator plate 10b separates the cathode 3 and the cathode current collector 6 of the cell 1a from a fuel cell adjacent the cathode side of the cell 1a.

In the embodiment shown in FIG. 1, the anode electrode 2 and the cathode electrode 3 are formed from porous materials. In particular, the anode electrode 2 may be formed from a porous Ni—Al, Ni—Cr or Ni—Cr—Al material, while the cathode electrode 3 may be formed from a porous sintered NiO material.

In this case, the electrolyte matrix 4 is formed from a porous ceramic material and, during fuel cell operation, the matrix is saturated with a high-performance Li/Na carbonate electrolyte of the present invention including at least a first carbonate electrolyte having a first composition. In accordance with the present invention, the first carbonate electrolyte is stored, prior to operation of the fuel cell and typically before assembly of the fuel cell stack, in at least the pores of the cathode electrode 3, and may also be stored in the porous electrolyte matrix 4 and/or the anode electrode 2. In the illustrative embodiments described below, the cathode electrode 3 is filled with the first carbonate electrolyte of the high-performance Li/Na carbonate electrolyte during the manufacturing process and prior to assembly into the fuel cell. In the present illustrative embodiment, the cathode electrode stores therein at least 60 wt % of the total electrolyte stored in the fuel cell assembly, with at least 90 wt % of the first carbonate electrolyte being stored in the cathode electrode. In this way, after the cathode electrode is assembled into the fuel cell stack, and during conditioning and operation of the fuel cell, the first carbonate electrolyte stored in the cathode electrode melts and permeates the electrolyte matrix 4. As mentioned above, in some embodiments, the anode electrode and/or the electrolyte matrix may be filled with the first carbonate electrolyte in addition to filling the cathode electrode.

In the present invention shown in FIG. 1, the high-performance Li/Na carbonate electrolyte also includes a second carbonate electrolyte having a second composition. In some embodiments, the second composition of the second carbonate electrolyte is different from the first composition of the first carbonate electrolyte, while in other embodiments, the first and second compositions are the same. As shown, the cathode current collector 6 stores therein a predetermined amount of the second carbonate electrolyte 12, which can be stored in pre-selected passages formed by the cathode current collector 6. In some embodiments, the second carbonate electrolyte can also be stored in pre-selected passages of the anode current collector. As mentioned above, at least 60 wt % of the total electrolyte amount stored in the fuel cell assembly, including the first and the second carbonate electrolyte, is stored in the cathode electrode, with at least 90 wt % of the first carbonate electrolyte being stored in the cathode electrode. In certain embodiments, 60-70 wt % of the total electrolyte amount is stored in the cathode electrode, and 90-100 wt % of the first carbonate electrolyte is stored in the cathode electrode. The high-performance Li/Na carbonate electrolyte, and in particular the first and second carbonate electrolytes are described in more detail herein below.

The high-performance Li/Na carbonate electrolyte will now be described. In accordance with the present invention, the high-performance Li/Na carbonate electrolyte with improved performance and having 60 mol % or more of $Li_2CO_3$ and 40 mol % or less of $Na_2CO_3$ is achieved by storing in at least the cathode electrode the first carbonate electrolyte comprising a high-lithium Li/Na electrolyte doped with one or more additive materials, and storing in at least the cathode current collector or the anode current collector the second carbonate electrolyte having the second composition. In particular, the first carbonate electrolyte of the high-performance Li/Na carbonate electrolyte has the first composition comprising a first predetermined amount of eutectic 52Li/48Na carbonate electrolyte (52 mol % $Li_2CO_3$ and 48 mol % $Na_2CO_3$), a second predetermined amount of one or more additive materials and a third predetermined amount of one or more lithium precursor materials. The additive materials comprise one or more of $Rb_2CO_3$, $Cs_2CO_3$, $BaCO_3$, $La_2O_3$, $Bi_2O_3$, $Bi_2O_5$, $Ta_2O_5$, , $BaCO_3+Cs_2CO_3$, $Cs_2CO_3+Rb_2CO_3$, and mixtures thereof The lithium precursor material used in the first composition comprises one or more of Lithium Hydroxide (LiOH), $Li_2CO_3$, $LiNO_3$, lithium acetate, lithium oxalate and mixtures thereof In the illustrative embodiments described below, LiOH was selected as the lithium precursor material because LiOH has a relatively low melting point of 470° C. and the presence of LiOH in the electrolyte decreases the liquid temperature of the electrolyte, i.e. the melting point of the 52Li/48Na electrolyte, and improves the filling and the electrolyte distribution due to the wetting properties of LiOH. In addition, LiOH improves cathode lithiation. However, in other embodiments, other lithium precursors such as $Li_2CO_3$, $LiNO_3$, lithium acetate, lithium oxalate and mixtures thereof may be used.

In the first composition, the third predetermined amount of the lithium precursor, such as LiOH and/or $Li_2CO_3$, is between 1 wt % and 35 wt % of the mixture, while the combined first and second predetermined amounts form between 99 wt % and 65 wt % of the mixture. In addition, the second predetermined amount of the one or more additive materials is between 0.5 mol % and 7 mol % of the first predetermined amount of the eutectic 52Li/48Na electrolyte.

In some embodiments described below, the second composition of the second electrolyte stored in the cathode current collector and/or anode current collector is the same as the first composition of the first carbonate electrolyte stored in at least the cathode electrode. However, in other embodiments, the second composition of the second electrolyte stored in the cathode current collector and/or the anode current collector comprises either a eutectic 52Li/48Na electrolyte mixture or an off-eutectic electrolyte mixture having a higher lithium carbonate content. For example, in certain embodiments, the off-eutectic electrolyte mixture of the second composition comprises 80 mol % or more of $Li_2CO_3$ and 20 mol % or less of $Na_2CO_3$.

In the embodiments described below, when the second composition of the second electrolyte stored in the cathode current collector and/or anode current collector comprises the eutectic 52Li/48Na electrolyte, the first composition of the first carbonate electrolyte comprises 15-35 wt % of the lithium precursor, such as LiOH and/or $Li_2CO_3$, and 85-65 wt % of the 52Li/48Na electrolyte doped with one or more of the additive materials. However, when the second composition comprises the off-eutectic Li/Na carbonate electrolyte, the first composition of the high-performance Li/Na carbonate electrolyte comprises 1-8 wt % of the lithium precursor, such as LiOH or $Li_2CO_3$, and 92-99 wt % of the 52Li/48Na electrolyte doped with one or more of the additive materials. In some illustrative embodiments in which the second composition of the second electrolyte is the same as the first composition of the first electrolyte, the first and second compositions comprise 6-35 wt % of the lithium precursor, such as LiOH or $Li_2CO_3$, and 65-94 wt % of the 52Li/48Na electrolyte doped with one or more of the additive materials.

In certain illustrative embodiments, the high performance Li/Na carbonate electrolyte having 60 mol %-68 mol % of $Li_2CO_3$ and 32 mol %-40 mol % of $Na_2CO_3$ were achieved by filling at least the cathode electrodes with the first carbonate electrolyte having a first composition including 65 wt %-85 wt % of Li/Na electrolyte doped with one or more additive materials and 15 wt %-35 wt % of LiOH, wherein the doped Li/Na electrolyte comprises 48.36 mol % of Li, 44.64 mol % of Na and 7 mol % of Rb or 50.44 mol % of Li, 46.56 mol % of Na and 3 mol % of Cs. As mentioned above, the cathode electrodes store therein at least 90 wt % of the first carbonate electrolyte, and at least 60 wt % of the total electrolyte stored in the fuel cell assembly, and preferably 60-70 wt % of the total electrolyte. In such embodiments, the cathode current collector and/or the anode current collector stores therein a predetermined amount of the second electrolyte comprising eutectic 52Li/48Na carbonate electrolyte or an off-eutectic such as 80Li/20Na.

In other embodiments, the high performance Li/Na carbonate electrolytes were achieved by filling at least cathode electrodes with the first carbonate electrolyte having the first composition including 92 wt %-94 wt % of the Li/Na carbonate electrolyte doped with one or more additive materials and 6 wt %-8 wt % of LiOH, wherein the doped Li/Na carbonate electrolyte comprises 48.36 mol % of Li, 44.64 mol % of Na and 7 mol % of Rb or 50.44 mol % of Li, 46.56 mol % of Na and 3 mol % of Cs. In such embodiments, the cathode current collector and/or the anode current collector stores therein a predetermined amount of the second carbonate electrolyte comprising off-eutectic Li/Na electrolyte which has 80 mol % or more of $Li_2CO_3$ and 20 mol % or less of $Na_2CO_3$. In other embodiments, the off-eutectic Li/Na electrolyte has 77-90 mol % of $Li_2CO_3$ and 23-10 mol % of $Na_2CO_3$. As in the other embodiment, the cathode electrodes of this embodiment store therein at least 90 wt % of the first carbonate electrolyte, and at least 60 wt % of the total electrolyte stored in the fuel cell assembly.

In these embodiments, the Rb and Cs additive materials improve the oxygen solubility in the electrolyte melt by lowering the surface tension. In order to promote pre-oxidation and lithiation reactions of the cathode during the conditioning of the fuel cell at low temperatures after the assembly of the fuel cell components into the fuel cell stack, it is important to store the additive materials, such as Rb and Cs, in the cathode electrode and to combine the doped Li/Na electrolyte with LiOH, or another lithium precursor. In particular, testing of electrolytes in which the doped Li/Na electrolyte comprises 48.36 mol % of Li, 44.64 mol % of Na and 7 mol % of Rb or 50.44 mol % of Li, 46.56 mol % of Na and 3 mol % of Cs showed that these mixtures melt around 460-470 C which is slightly lower than the melting point of 495 C of the eutectic 52Li/48Na electrolyte. Moreover, tests showed that the addition of small amounts of LiOH between 6 wt % and 35 wt % to these doped Li/Na electrolyte mixtures significantly decreased their melting point to about 420-430 C. In cathodes filled with these mixtures, including the doped Li/Na electrolyte and between 6 wt % and 35 wt % of LiOH, the pre-oxidation and lithiation of the cathodes, which are key steps in the cathode conditioning process, occurred at low temperatures (400-500° C.) and generated high active surface areas. Chemical analysis of the processes during conditioning showed that Li+ ions began to enter the NiO lattice of the cathodes at temperatures below 400° C., and that the presence of the Li+ ions in the cathode at low temperatures accelerated the lithiation process, also leading to a higher active surface area and higher electronic conductivity. The tests have also showed that highly lithiated cathodes have less NiO dissolution in the melt.

The main advantage of accelerating and increasing cathode lithiation using electrolytes having low melting points is the increased speed at which the fuel cell stack can reach a peak performance, as compared to the conventional fuel cell stacks using eutectic 52Li/48Na or 62Li/38K electrolytes. In particular, fuel cells using the high-performance Li/Na electrolytes described above were able to reach peak performance within 24-100 hours as compared to 500-1200 hours typically required for fuel cells using conventional eutectic 52Li/48Na or 62Li/38K electrolytes.

In addition to the embodiments described above, in other embodiments, the high-performance Li/Na carbonate electrolytes having 60 mol % to 68 mol % of $Li_2CO_3$ and 32 mol % to 40 mol % of $Na_2CO_3$ were achieved by filling at least cathode electrodes with the first carbonate electrolyte having the first composition including 65 wt %-85 wt % of the Li/Na carbonate electrolyte doped with one or more additive materials and 15 wt %-35 wt % of LiOH, wherein the doped Li/Na carbonate electrolyte comprises 50.96mol % of Li, 47.04 mol % of Na and 2 mol % of $Bi_2O_3$, or 50.44 mol % of Li, 46.56 mol % of Na, 1.5 mol % Cs and 1.5 mol % of $BaCO_3$, or 50.96 mol % of Li, 47.04 mol % of Na and 2 mol % of $Ta_2O_5$. In such embodiments, the cathode current collector and/or the anode current collector stores therein a predetermined amount of the second carbonate electrolyte comprising the eutectic 52Li/48Na carbonate electrolyte or an off-eutectic such as 80Li/20Na. As in the other embodiments, the cathode electrodes of this embodiment store therein at least 90 wt % of the first carbonate electrolyte, and at least 60 wt % of the total electrolyte stored in the fuel cell assembly.

In yet other embodiments, the high performance Li/Na carbonate electrolytes were achieved by filling at least cathode electrodes with the first carbonate electrolyte having the first composition including 92 wt %-94 wt % of the Li/Na carbonate electrolyte doped with one or more additive materials and 6 wt %-8 wt % of LiOH, wherein the doped Li/Na carbonate electrolyte comprises 50.96 mol % of Li, 47.04 mol % of Na and 2 mol % of $Bi_2O_3$, or 50.44 mol % of Li, 46.56 mol % of Na, 1.5 mol % of $BaCO_3$ and 1.5 mol % of Cs, or 50.96 mol % of Li, 47.04 mol % of Na and 2 mol % of $Ta_2O_5$. In such embodiments, the cathode current collector and/or the anode current collector stores therein a predetermined amount of the second carbonate electrolyte comprising the off-eutectic carbonate electrolyte, preferably having 80 mol % or more of $Li_2CO_3$ and 20 mol % or less of $Na_2CO_3$. As in the other embodiments, the cathode electrodes of this embodiment store therein at least 90 wt % of the first carbonate electrolyte, and at least 60 wt % of the total electrolyte stored in the fuel cell assembly.

In the embodiments described above, the lithium precursor used is LiOH. However, it is understood that other lithium precursors may be used. For example, instead of LiOH alone, a mixture of LiOH and $Li_2CO_3$ may be used, wherein LiOH comprises 75-85 mol % of the mixture and $Li_2CO_3$ comprises 15-25 mol % of the mixture.

The improvements in the performance of the fuel cells using the high-performance electrolyte of the further embodiments described above were similar to the improvements in the performance of the fuel cells using the high-performance electrolyte that included Rb and Cs as additive materials. Specific examples of illustrative electrolyte compositions and methods of forming such compositions will be described below.

EXAMPLE 1

In this illustrative embodiment, the high-performance Li/Na electrolyte comprises the first carbonate electrolyte having the first composition stored in the cathode electrode and the second carbonate electrolyte having the second composition different from the first composition stored in the cathode current collector. A single cell (250 cm$^2$) was used for storing the high-performance Li/Na electrolyte and for testing the performance of the fuel cell with the high-performance Li/Na electrolyte. Each single cell includes a porous Ni—Al and/or Ni—Cr anode electrode and a porous in-situ oxidized and lithiated NiO cathode electrode, separated by a porous ceramic $LiAlO_2$ matrix. In this example, the cathode electrode (250 cm$^2$) was filled with the first carbonate electrolyte mixture of 13.7 grams of 48.36 mol % of $Li_2CO_3$, 44.64 mol % of $Na_2CO_3$ and 7 mol % of Rb additive material and 6.3 grams of LiOH. The cathode current collector (C-CCC) stored therein 14 grams of the eutectic 52 mol % $Li_2CO_3$/48 mol % $Na_2CO_3$ electrolyte.

The single fuel cells formed in this example were tested by passing fuel gas comprising 72.8% $H_2$, 18.2% $CO_2$ and 9% $H_2O$ through the anode side of the fuel cell and by passing oxidant gas comprising 18.5% $CO_2$, 12.1% $O_2$, 66.4% $N_2$ and 3% $H_2O$ through the cathode side of the fuel cell. Testing was performed at 160 mA/cm$^2$ current density and 75% utilization in the anode and the cathode. During conditioning and/or operation of the fuel cells, LiOH in the cathode reacted with $CO_2$ in the oxidant gas to form lithium carbonate via the following reaction:

$$2LiOH+CO_2 \rightarrow Li_2CO_3+H_2O \qquad (1)$$

Figure 2:
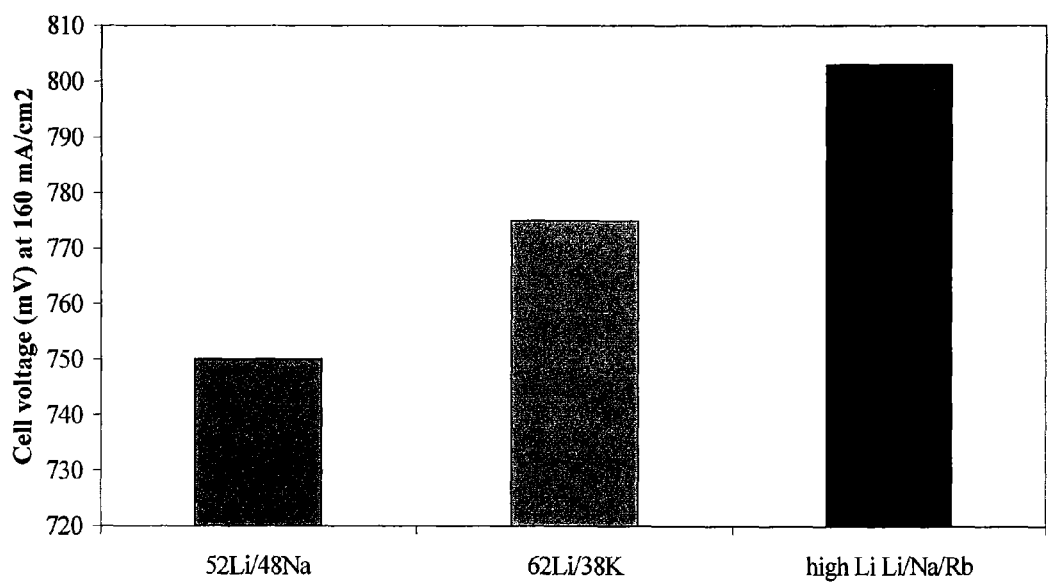
FIG. 2 shows a graph of performance data of the single fuel cells of FIG. 1 and of conventional fuel cells using a eutectic electrolyte of 52% Li/48% Na and of 62% Li/38% K at 650° C., 160 mA/cm² and 75% utilization.

Tests on single cells at the operating temperature of 650° C. showed that, as a result of using the high-performance electrolyte of this example, the cell voltage was improved by 28 mV as compared to single cells with the conventional eutectic 62Li/38K electrolyte and by more than 53 mV as compared to single cells with the conventional eutectic 52Li/48Na electrolyte. These test results are summarized in FIG. 2, which shows a graph of performance data of the fuel cells of FIG. 1 and of conventional fuel cells using a eutectic electrolyte of 52% Li/48% Na and of 62% Li/38% K. In FIG. 2, the X-axis indicates the type of electrolyte used in the fuel cell during testing, while the Y-axis indicates the cell voltage in mV at the current density of 160 mA/cm$^2$. As shown in FIG. 2, the cell voltage of the fuel cells with the high-performance Li/Na/Rb electrolyte was about 802 mV, which is significantly higher than the cell voltage of 774 mV in fuel cells using conventional 62Li/38K electrolyte and the cell voltage of 750 mV in fuel cells using conventional 52Li/48Na electrolyte. These improvements in the fuel cell performance are due to the low cathode polarization which results from the high surface area, low mass-transfer and high gas solubility in the melt. In order to achieve such low cathode polarization, it is important to store the Li/Na electrolyte doped with the Rb additive material and the LiOH in the cathode electrode, rather than in the matrix, the anode or the cathode current collector. It has been found that storing all of the Rb additive material in the matrix, anode or the cathode current collector significantly decreased the cell performance due to high cathode polarization.

Similar tests were also performed in button cells (3 cm$^2$) using the high-performance Li/Na electrolyte of this example at the current density of 160 mA/cm$^2$, low utilization of 5% and at an operating temperature of 650° C. Similar improvements in the cell voltage were recorded relative to the conventional cells using the eutectic 62Li/38K electrolyte. In particular, the cell voltage of button cells with the high-performance Li/Na electrolyte of this example was 25-30 mV higher than the cell voltage in conventional cells.

Figure 3:
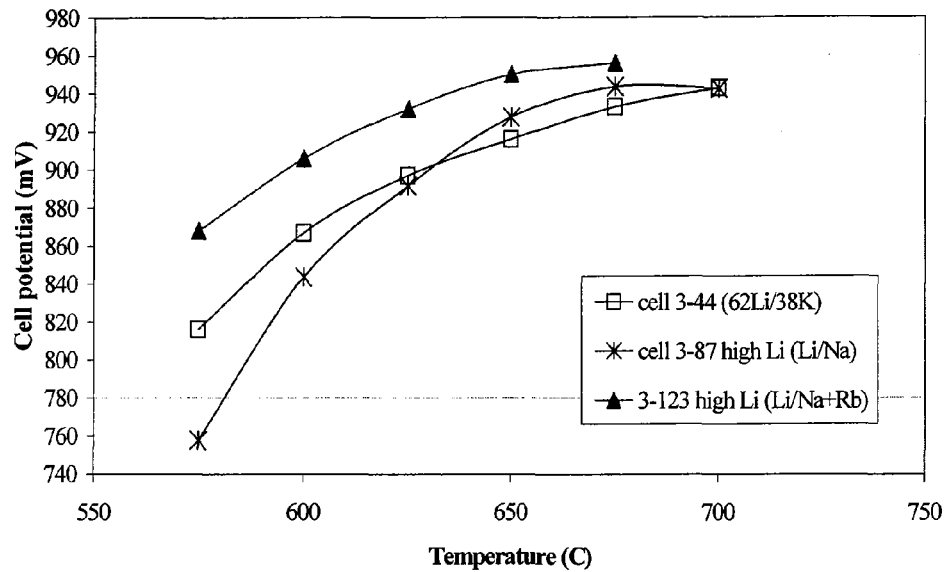
FIG. 3 shows a graph of the effect of operating temperature on the performance of button cells using high-performance Li/Na carbonate electrolyte with $Rb_2CO_3$ as an additive material compared to button cells using other electrolytes at 160 mA/cm² current density and low 5% fuel utilization.

The results of the tests performed in button cells at different operating temperatures are shown in FIG. 3, which shows a graph of the effect of operating temperature on the performance of button cells using the high performance Li/Na electrolyte and other electrolytes. In FIG. 3, the X-axis represents the operating temperature of the fuel cell while the Y-axis represents the cell potential in mV at 160 mA/cm$^2$. As shown in FIG. 3, the cell potential of button cells with the high performance Li/Na electrolyte of this example was measured at different operating temperatures between 575° C. and 700° C. The cell potential of button cells with the conventional eutectic 62Li/38K electrolyte and with high Lithium Li/Na electrolyte was also measured at different operating temperatures. As shown, the cell potential of button cells with the high performance Li/Na electrolyte of this example was higher than the cell potentials of the button cells with the conventional electrolytes, particularly at the operating temperatures of 600° C. or less. For example, at the operating temperatures of 575° C. and 600° C., the cell potentials of the buttons cells with the high-performance Li/Na electrolyte of this example were 865 mV and 907 mV, respectively, while the cell potentials of the button cells with the conventional 62Li/38K electrolyte were 818 mV at 575° C. and 868 mV at 600° C. and the cell potentials of the button cells with the high Li Li/Na electrolyte were 755 mV at 575° C. and 845 mV at 600° C.

Figure 4:
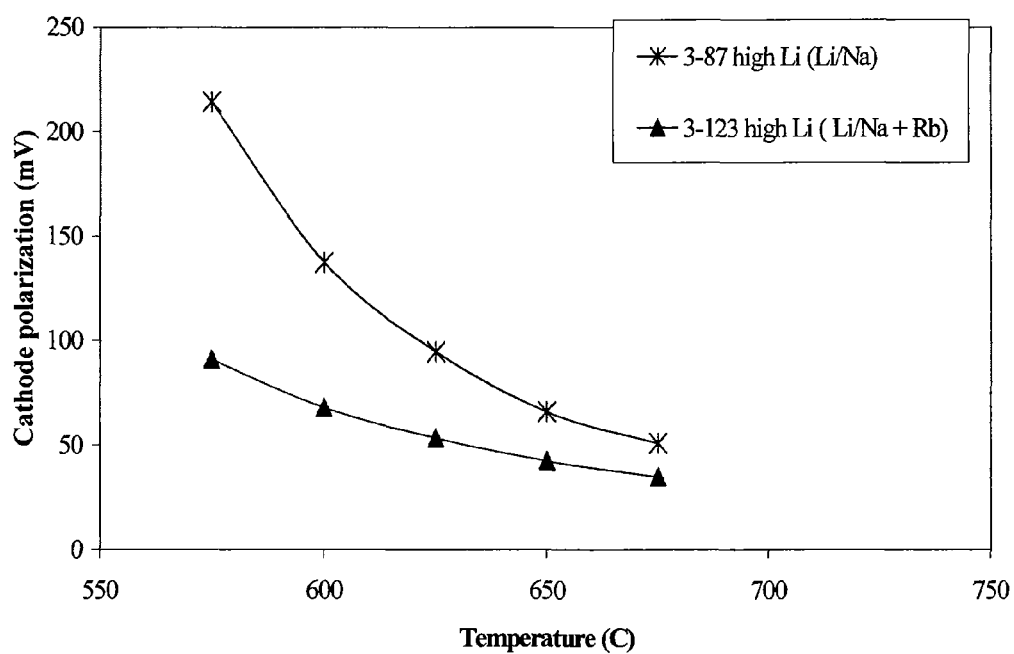
FIG. 4 shows a graph of cathode polarization in button cells using high-performance Li/Na carbonate electrolyte with Rb as an additive material and button cells with conventional electrolyte at different operating temperatures at 160 mA/cm² current density and low 5% fuel utilization.

In addition, cathode polarization in button cells using high-performance Li/Na electrolyte of this example was compared to cathode polarization of button cells with the high Li Li/Na electrolyte. The results of these tests are shown in FIG. 4, which shows a graph of cathode polarization in button cells at different temperatures, and in which the X-axis represents the operating temperature while the Y-axis represents cathode polarization in mV at 160 mA/cm$^2$. As shown in FIG. 4, cathode polarization in the button cells with the high-performance Li/Na electrolyte of this example was significantly lower than in button cells with the high Li Li/Na electrolyte, particularly at low operating temperatures of 600° C. or below. In particular, cathode polarization in the button cells of with the high-performance electrolyte of this example was about 75 mV at 575° C. and about 65 mV at 600° C., as compared to cathode polarization of about 215 mV at 575° C. and 135 mV at 600° C. in button cells with the high Li Li/Na electrolyte.

EXAMPLE 2

In this example, the high-performance Li/Na electrolyte comprises the first carbonate electrolyte having comprising Li/Na electrolyte doped with $Cs_2CO_3$ and LiOH stored in the cathode electrode and the second carbonate electrolyte comprising eutectic 52Li/48Na electrolyte. A single fuel cell (250 cm$^2$) having a similar construction as the single fuel cell in Example 1 was used for storing the high-performance Li/Na electrolyte and for testing the performance of the fuel cell with the high-performance Li/Na electrolyte. In this example, the cathode electrode (250 cm$^2$) was filled with the first carbonate electrolyte mixture of 13.7 grams of 50.44 mol % of $Li2CO_3$, 46.56 mol % of $Na_2CO_3$ and 3 mol % of $Cs_2CO_3$ additive material and 6.3 grams of LiOH. The cathode current collector (C-CCC) stored therein 14 grams of the eutectic 52 mol % $Li_2CO_3$/48 mol % $Na_2CO_3$ electrolyte.

Figure 5:
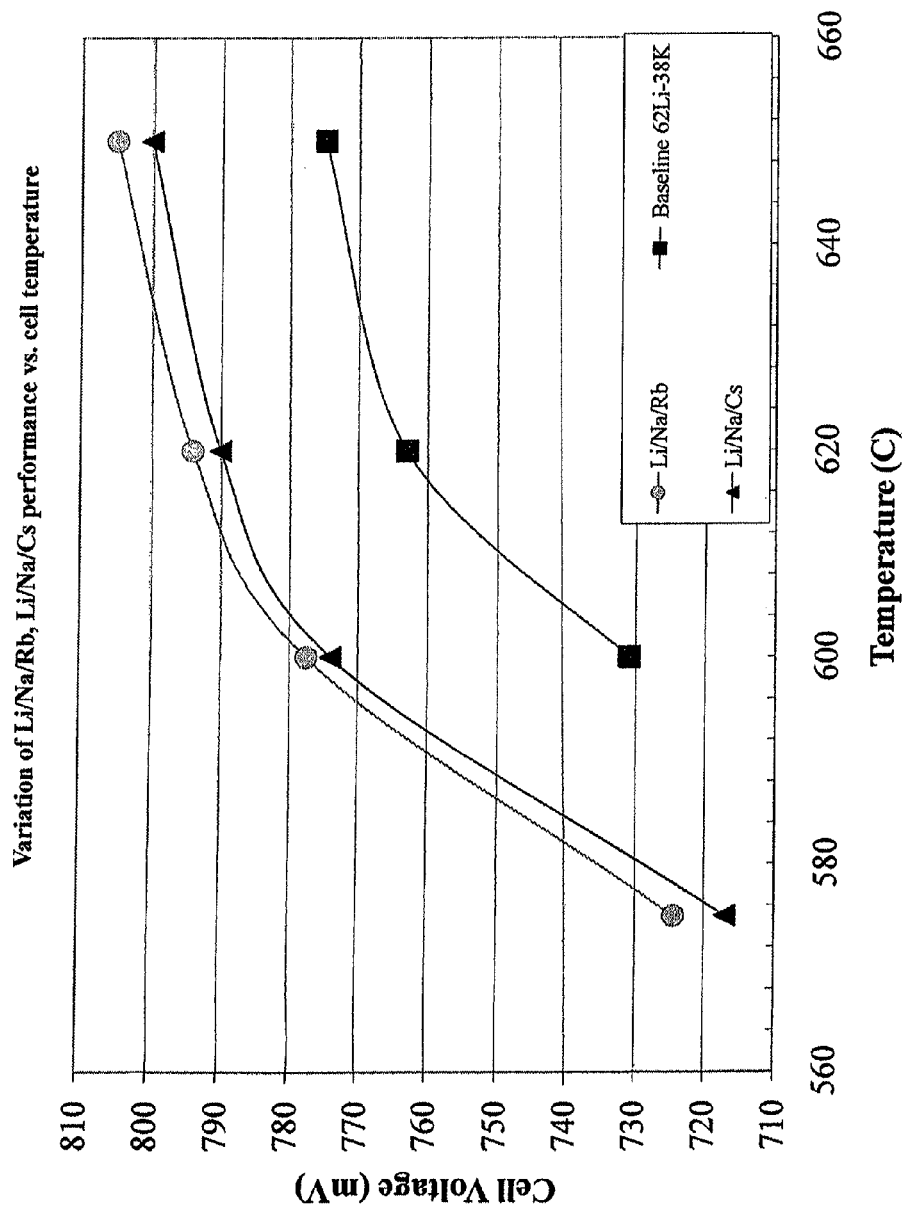
FIG. 5 shows a graph of performance data of single fuel cells using the high-performance Li/Na carbonate electrolyte with Rb or Cs as an additive material and single fuel cells using conventional electrolyte and the effect of operating temperature on cell voltage at 160 mA/cm² current density and 75% fuel utilization.

The single fuel cells formed in this example were tested by passing fuel gas comprising 72.8% $H_2$, 18.2% $CO_2$ and 9% $H_2O$ through the anode side of the fuel cell and by passing oxidant gas comprising 18.5% $CO_2$, 12.1% $O_2$, 66.4% $N_2$ and 3% $H_2O$ through the cathode side of the fuel cell. Testing was performed at 160 mA/cm$^2$ current density and 75% utilization in the anode and the cathode. Tests on single cells at the operating temperature of 650° C. showed that, as a result of using the high-performance electrolyte of this example, the cell voltage was improved by 25 mV at 650° C. and by more than 45 mV at 600° C. as compared to the cell voltage in single cells with the conventional eutectic 62Li/38K electrolyte. These test results, as well as the test results from the first example, are shown in FIG. 5, which shows graph of performance data of the fuel cells of this and the first examples and of conventional fuel cells using a eutectic electrolyte of 62% Li/38% K. In FIG. 5, the X-axis represents the operating temperature of the fuel cells during testing, while the Y-axis indicates the cell voltage in mV at the current density of 160 mA/cm$^2$ and 75% fuel utilization. As shown in FIG. 5, the cell voltages of the fuel cells with the high-performance Li/Na/Rb electrolyte were about 724 mV at 575° C. and 778 mV at 600° C., and the cell voltages of the fuel cells with the high-performance Li/Na/Cs electrolyte were about 715 mV at 575°

C. and 773 mV at 600° C. In contrast, the cell voltage of the fuel cells with the conventional eutectic 62Li/38K electrolyte was about 730 mV at 600° C. In addition, the conventional fuel cells (52Li/48Na) could not support the load at temperatures below 600° C. due to high cathode polarization.

As evidenced by the testing results, the advantage of using the high-performance Li/Na/Rb and Li/Na/Cs electrolytes is more pronounced at low operating temperatures of less than 600° C. These advantageous effects are the result of improved $O_2$ solubility, reduced mass-transfer resistance and reduced flooding in the cathode electrodes filled with these high-performance electrolytes.

EXAMPLE 3

In this example, single cells (250 cm$^2$) having a similar construction to those described in the above examples were filled with the high-performance Li/Na electrolyte and were tested to determine the performance of the electrolyte. In this illustrative example, the cathode electrode is filled with 21 grams of the first carbonate electrolyte comprising a mixture of 94 wt % of Li/Na electrolyte doped with Cs or Rb additive materials and 6 wt % of LiOH The Li/Na electrolyte doped with Cs or Rb additive materials in this example comprises 52 mol % of $Li_2CO_3$, 48 mol % of $Na_2CO_3$ and 2-4 mol % of $Cs_2CO_3$ or 2-5 mol % of $Rb_2CO_3$. The cathode current collector stored therein 14 grams of an off-eutectic Li/Na electrolyte comprising 80 mol % of $Li_2CO_3$ and 20 mol % of $Na_2CO_3$. In some embodiments, the off-eutectic Li/Na electrolyte comprised 77 mol % $Li_2CO_3$ and 23 mol % of $Na_2CO_3$, and in yet other embodiments, the off-eutectic electrolyte comprised 90 mol % of $Li_2CO_3$ and 10 mol % of $Na_2CO_3$. The off-eutectic Li/Na electrolyte stored in the cathode current collector has the effect of increasing the Lithium content in the electrolyte so as to reduce cathode flooding and to enhance the active cathode surface area.

When the single fuel cells were tested at 160 mA/cm$^2$ current density and 75% fuel utilization, the single fuel cells using the high-performance Li/Na electrolytes of this example exhibited higher cell voltage by about 20-25 mV at the operating temperature of 650° C. as compared to the fuel cells with the conventional 62Li/38K electrolyte. In addition, at low temperatures below 600° C., the cell voltage of fuel cells with the high-performance Li/Na electrolytes of this example were 30-40 mV higher than the cell voltage of conventional fuel cells with the 62Li/38K electrolyte.

EXAMPLE 4

In this example, bench-scale button cells (3 cm$^2$) were tested to evaluate performance of the high-performance Li/Na electrolyte that includes $Bi_2O_3$ as an additive material. Each button cell included a porous anode electrode formed from Ni—Al and/or Ni—Cr and a porous in-situ oxidized and lithiated NiO cathode electrode, separated by a porous ceramic $LiAlO_2$ matrix. In this illustrative example, the cathode electrode is filled with 0.26 grams of the first carbonate electrolyte comprising a mixture of 96 wt % of Li/Na electrolyte doped with the $Bi_2O_3$ additive material and 4 wt % of LiOH. The Li/Na electrolyte doped with $Bi_2O_3$ additive material in this example comprises 50.96 mol % of $Li_2CO_3$, 47.04 mol % of $Na_2CO_3$ and 2 mol % of $Bi_2O_3$. The cathode current collector stored therein 0.24 grams of an off-eutectic Li/Na electrolyte comprising 80 mol % of $Li_2CO_3$ and 20 mol % of $Na_2CO_3$.

The button cells were tested at 160 mA/cm$^2$ current density and low fuel utilization of about 5%. During the testing, fuel gas comprising 72.8% $H_2$, 18.2% $CO_2$ and 9% $H_2O$ was conveyed through the anode side and oxidant gas comprising 18.5% $CO_2$, 12.1% $O_2$, 66.4% $N_2$ and 3% $H_2O$ was conveyed through the cathode side. The tests showed that button cells using the high-performance Li/Na electrolytes of this example exhibited higher cell voltage by about 28 mV at the operating temperature of 650° C. as compared to the fuel cells with the conventional 62Li/38K electrolyte. In addition, when compared with the fuel cells using the conventional 52Li/48Na electrolyte, the cell voltage of the button cells using the high-performance Li/Na electrolytes of this example was higher by more than 90 mV at 650° C.

Figure 6:
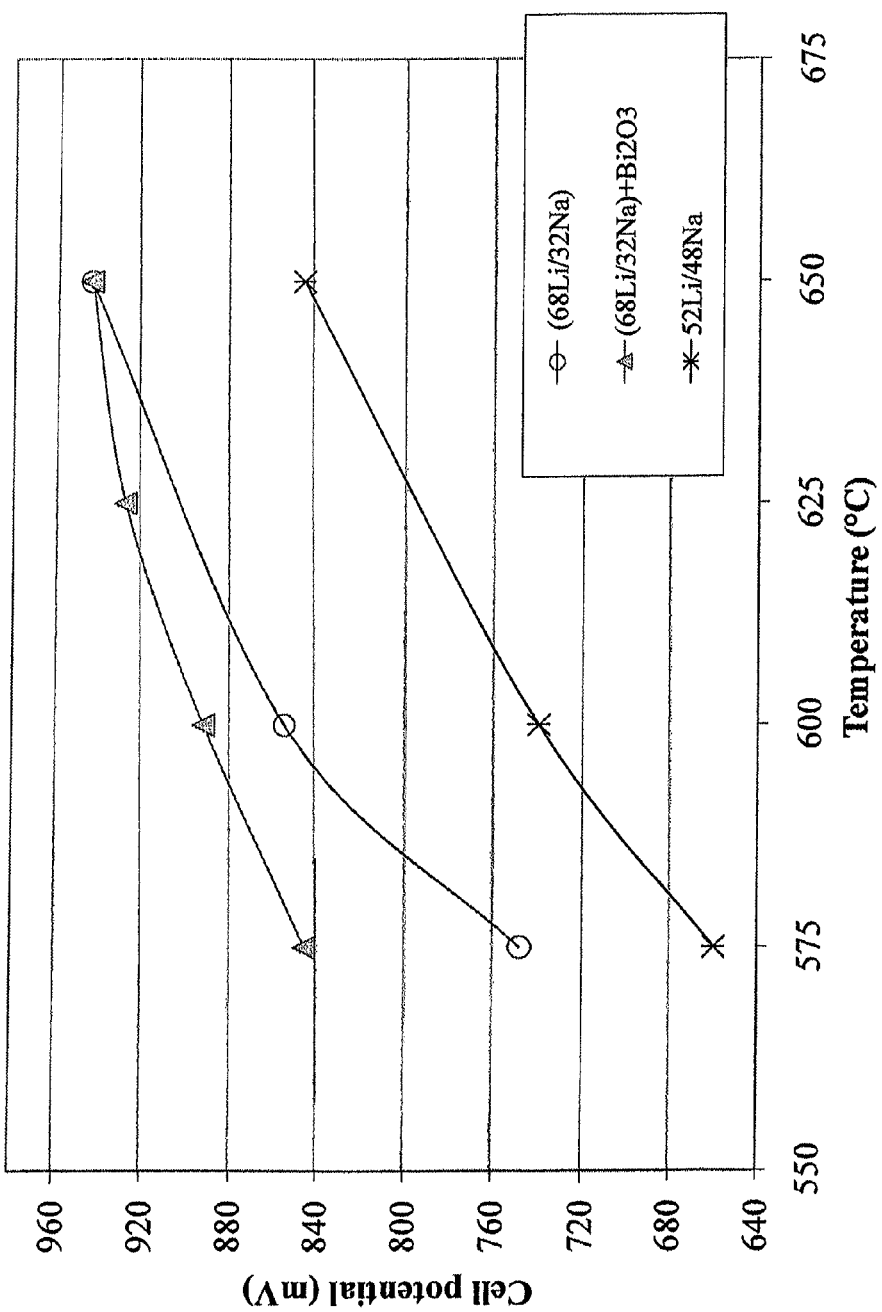
FIG. 6 shows a graph of performance data of button cells using the high-performance Li/Na carbonate electrolyte with $Bi_2O_3$ as an additive material and button cells using high lithium Li/Na electrolyte or conventional electrolyte (52Li/48Na) and the effect of operating temperature on cell potential at 160 mA/cm² current density and low fuel utilization (5%)

FIG. 6 shows the results of the testing of the button cells in a graph in which the X-axis represents the operating temperature of the cell and the Y-axis represents the cell potential in mV at 160 mA/cm$^2$. As shown in FIG. 6, the button cells using the high-performance Li/Na electrolyte had a significantly higher cell potential than the conventional button cells using the eutectic 52Li/48Na electrolyte and higher cell potential than the button cells using high-lithium 68Li/32Na electrolyte, particularly at lower operating temperatures. For example, the cell potentials of the button cells with the high-performance Li/Na electrolytes at 575° C. and 600° C. operating temperatures were about 845 mV and 890 mV, respectively, while the cell potentials of the button cells with the eutectic 52Li/48Na electrolyte at these temperatures were about 660 mV and 745 mV, respectively. Also, the cell potentials of the button cells with the high-Lithium 68Li/32Na electrolytes at the operating temperatures of 575° C. and 600° C. were about 745 mV and 850 mV, respectively.

Thus, as shown in FIG. 6, the performance of the fuel cells with the electrolyte of this example is significantly higher than that of the fuel cells with the conventional eutectic or off-eutectic Li/Na electrolyte. This improved performance is mainly due to the low cathode polarization and the low mass-transfer resistance which results from the improved oxygen solubility in the electrolyte melt. In this example, the addition of $Bi_2O_3$ additive material to the first electrolyte increases the current of the oxygen reduction reaction by about two times and confirms that this additive material enhances the solubility of oxygen in the electrolyte and improves the kinetics of the reaction.

Figure 7:
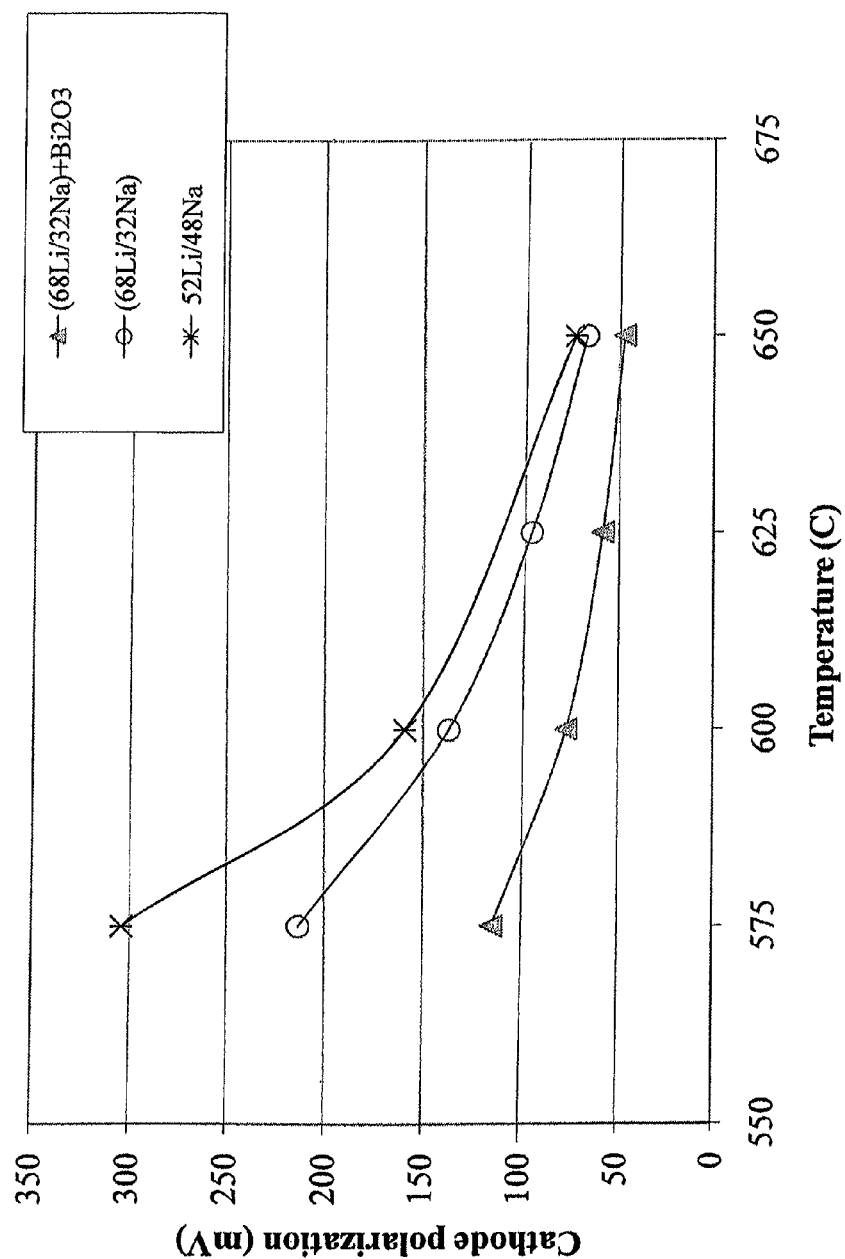
FIG. 7 shows a graph of performance data of button cells using the high-performance Li/Na carbonate electrolyte with $Bi_2O_3$ as an additive material and button cells using high-lithium Li/Na electrolyte or conventional electrolyte and the effect of operating temperature on cathode polarization at 160 mA/cm² current density and low 5% fuel utilization.

The effect of the $Bi_2O_3$ additive material on the cathode polarization is shown in a graph of FIG. 7, in which the X-axis represents the operating temperature and the Y-axis represents the cathode polarization in mV. As shown in FIG. 7, the fuel cells using the high-performance Li/Na electrolyte of this example had significantly lower cathode polarization, when compared to fuel cells using conventional eutectic 52Li/48Na electrolyte or using high-lithium 68Li/32Na electrolyte, particularly at lower operating temperatures. For example, cathode polarization in fuel cells using the high-performance electrolyte of this example was about 110 mV at the 575° C. operating temperature and about 75 mV at the 600° C. operating temperature. In contrast, cathode polarization in fuel cells using the high-lithium 68Li/32Na electrolyte was about 210 mV at 575° C. and about 140 mV at 600° C., and cathode polarization in fuel cells using the eutectic 52Li/48Na electrolyte was about 300 mV at 575° C. and about 160 mV at 600° C. In addition, cathode polarization in fuel cells using the high-performance electrolyte remained lower than cathode polarization in the fuel cells using the eutectic and off-eutectic Li/Na electrolyte at higher operating temperatures.

Although in this example all of the $Bi_2O_3$ additive material is stored only as part of the first carbonate electrolyte in the cathode electrode, in other embodiments, additional $Bi_2O_3$ additive material may also be stored in the cathode current collector, the electrolyte matrix or the anode electrode, without negatively affecting the cell performance. Moreover, other lithium precursors may be used instead of, or in addition to, the LiOH, such as for example $Li_2CO_3$, in the first electrolyte.

The above examples describe the specific compositions of the high-performance Li/Na electrolyte and the test results showing improved performance of the fuel cells and cathodes using the high-performance Li/Na electrolyte compared to fuel cells using conventional electrolytes. In addition to the compositions described in the above examples, similar improvements were observed in high-performance Li/Na electrolyte using $Ta_2O_5$, $La_2O_3$, and a mixture of $BaCO_3$ and $Cs_2CO_3$ as the additive materials in at least the first carbonate electrolyte.

In all cases it is understood that the above-described arrangements are merely illustrative of the many possible specific embodiments which represent applications of the present invention. Numerous and varied other arrangements, including use of different amounts of components in the high-performance electrolyte, can be readily devised in accordance with the principles of the present invention without departing from the spirit and scope of the invention.

We claim:

1. A high-performance carbonate electrolyte for use in a molten carbonate fuel cell comprising a cathode electrode, an anode electrode, an electrolyte matrix and at least a cathode current collector abutting said cathode electrode, said high-performance carbonate electrolyte comprising:
    a first carbonate electrolyte stored in at least the cathode electrode of the molten carbonate fuel cell comprising a mixture of eutectic Li/Na carbonate electrolyte doped with one or more additive materials and one or more lithium precursors, wherein said additive materials include one or more of $BaCO_3$, $La_2O_3$, $Bi_2O_3$, $Ta_2O_5$ and mixtures thereof; and
    a second carbonate electrolyte stored in at least said cathode current collector, said second carbonate electrolyte having a composition that is the same or different from the first carbonate electrolyte.

2. A high-performance carbonate electrolyte in accordance with claim 1, wherein said one or more lithium precursors comprise one or more of LiOH, $Li_2CO_3$, $LiNO_3$, lithium acetate and lithium oxalate.

3. A high-performance carbonate electrolyte in accordance with claim 2, wherein said second carbonate electrolyte has a different composition from the first carbonate electrolyte and said second carbonate electrolye comprises one of a eutectic mixture of $Li_2CO_3$ and an off-eutectic mixture of $Li_2CO_3$ and $Na_2CO_3$.

4. A high-performance carbonate electrolyte in accordance with claim 3, wherein:
    said first carbonate electrolyte comprises between 65 wt % and 85 wt % of said eutectic Li/Na electrolyte doped with said one or more additive materials and between 15 wt % and 35 wt % of said one or more lithium precursors, said doped eutectic Li/Na electrolyte comprises between 93 mol % and 99.5 mol % of said eutectic mixture of 52 mol % $Li_2CO_3$ and 48 mol % $Na_2CO_3$ and between 0.5 mol % and 7 mol % of said one or more additive materials; and
    said second carbonate electrolyte comprises said eutectic mixture of $Li_2CO_3$ and $Na_2CO_3$.

5. A high-performance carbonate electrolyte in accordance with claim 1, wherein said one or more lithium precursors comprises one of LiOH and a mixture of 80-85 mol % LiOH and 15-20 mol % $Li_2CO_3$.

6. A high-performance carbonate electrolyte in accordance with claim 4, wherein:
    said one or more lithium precursors comprises one of LiOH and a mixture of 80-85 mol % LiOH and 15-20 mol % $Li_2CO_3$;
    eutectic Li/Na carbonated electrolyte doped with one or more additive materials of said first carbonate electrolyte comprises one of:
    (a) 48.36 mol % of $Li_2CO_3$, 44.64 mol % of $Na_2CO_3$ and 7 mol % of $Rb_2CO_3$;
    (b) 50.44 mol % of $Li_2CO_3$, 46.56 mol % of $Na_2CO_3$ and 3 mol % $Cs_2CO_3$;
    (c) 50.96 mol % of $Li_2CO_3$, 47.04 mol % of $Na_2CO_3$ and 2 mol % of $Bi_2O_3$;
    (d) 50.44 mol % of $Li_2CO_3$, 46.56 mol % of $Na_2CO_3$, 1.5 mol % of $Cs_2CO_3$ and 1.5 mol % of $BaCO_3$; and;
    (e) 50.96 mol % of $Li_2CO_3$, 47.04 mol % of $Na_2CO_3$ and 2 mol % of $Ta_2O_5$; and
    said second carbonate electrolyte comprises a eutectic mixture of 52 mol % of $Li_2CO_3$ and 48 mol % of $Na_2CO_3$.

7. A high-performance carbonate electrolyte in accordance with claim 3, wherein:
    said first carbonate electrolyte comprises between 92 wt % and 99 wt % of said eutectic Li/Na electrolyte doped with said one or more additive materials and between 1 wt% and 8 wt % of said one or more lithium precursors, said doped eutectic Li/Na electrolyte comprises between 93 mol % and 99.5 mol % of said eutectic mixture of 52 mol % $Li_2CO_3$ and 48 mol % $Na_2CO_3$ and between 0.5 mol % and 7 mol % of said one or more additive materials; and
    said second carbonate electrolyte comprises said off-eutectic mixture of $Li_2CO_3$ and $Na_2CO_3$ comprising 80 mol % or more of $Li_2CO_3$ and 20 mol % or less of $Na_2CO_3$.

8. A high-performance carbonate electrolyte in accordance with claim 7, wherein:
    said lithium precursor comprises one of LiOH and a mixture of 80-85 mol % of LiOH and 15-20 mol % of $Li_2CO_3$;
    eutectic Li/Na carbonate electrolyte doped with one or more additive materials of said first carbonate electrolyte comprises one of:
    (a) 50.96 mol % of $Li_2CO_3$, 47.04 mol % of $Na_2CO_3$ and 2 mol % of $Bi_2CO_3$;
    (b) 50.44 mol % of $Li_2CO_3$, 46.56 mol % of $Na_2CO_3$, 1.5 mol % of $BaCO_3$ and 1.5 mol % of $Cs_2CO_3$; and
    (c) 50.96 mol % of $Li_2CO_3$, 47.04 mol % of $Na_2CO_3$ and 2 mol % of $Ta_2O_5$; and
    said second carbonate electrolyte comprises said off-eutectic mixture of $Li_2CO_3$ and $Na_2CO_3$ comprising 80 mol % or more of $Li_2CO_3$ and 20 mol % or less of $Na_2CO_3$.

9. A high-performance carbonate electrolyte in accordance with claim 2, wherein said second carbonate electrolyte has the same composition as the first carbonate electrolyte, and said first and second carbonate electrolytes comprise between 65 wt% and 94 wt % of said eutectic Li/Na electrolyte doped with said one or more additive materials and between 6 wt % and 35 wt % of lithium precursors, said doped eutectic Li/Na electrolyte comprises between 93 mol % and 99.5 mol % of said eutectic mixture of 52 mol % $Li_2CO_3$ and 48 mol % $Na_2CO_3$ and between 0.5 mol % and 7 mol % of said one or more additives.

10. A high-performance carbonate electrolyte in accordance with claim 1, wherein at least 90 wt % of said first carbonate electrolyte is stored in said cathode electrode and at least 60% of said total electrolyte, including said first carbonate electrolyte and said second carbonate electrolyte, is stored in said cathode electrode.

11. A molten carbonate fuel cell assembly comprising:
a cathode electrode;
an anode electrode;
an electrolyte matrix disposed between said cathode electrode and said anode electrode;
a cathode current collector abutting said cathode electrode; and
a high-performance carbonate electrolyte in accordance with claim 1, wherein said first carbonate electrolyte is stored in at least said cathode electrode and said second carbonate electrolyte is stored in at least said cathode current collector.

12. A molten carbonate fuel cell assembly in accordance with claim 11, wherein said one or more lithium precursors in said high-performance carbonate electrolyte comprise one or more of LiOH, $Li_2CO_3$, $LiNO_3$ lithium acetate and lithium oxalate.

13. A molten carbonate fuel cell assembly in accordance with claim 12, wherein said second carbonate electrolyte of said high-performance carbonate electrolyte has a different composition from the first carbonate electrolyte of said high-performance carbonate electrolyte and said second carbonate electrolyte comprises one of a eutectic mixture of $Li_2CO_3$ and $Na_2CO_3$ and an off-eutectic mixture of $Li_2CO_3$ and $Na_2CO_3$.

14. A molten carbonate fuel cell assembly in accordance with claim 13, wherein:
said first carbonate electrolyte of said high-performance carbonate electrolyte comprises Between 65 wt % and 85 wt % of said eutectic Li/Na electrolyte doped with said one or more additive materials and between 15 wt % and 35 wt % of said one or more lithium precursors, said doped eutectic Li/Na electrolyte comprises between 93 mol % and 99.5 mol % of said eutectic mixture of 52 mol % $Li_2CO_3$ and 48 mol % $Na_2CO_3$ and between 0.5 mol % and 7 mol % of said one or more additive materials; and
said second carbonate electrolyte comprises said eutectic mixture of $Li_2CO_3$ and $Na_2CO_3$.

15. A molten carbonate fuel cell assembly in accordance with claim 11, wherein said one or more lithium precursors in said first carbonate electrolyte comprises one or LiOH and a mixture of 80-85 mol % LiOH and 15-20 mol % $Li_2CO_3$.

16. A molten carbonate fuel cell assembly in accordance with claim 14, wherein:
said one or more lithium precursors in said first carbonate electrolyte comprises one or LiOH and a mixture of 80-85 mol % LiOH and 15-20 mol % $Li_2CO_3$;
eutectic Li/Na carbonated electrolyte doped with one or more additive materials of said first carbonate electrolyte comprises one of:
(a) 48.36 mol % of $Li_2CO_3$, 44.64 mol % of $Na_2CO_3$ and 7 mol % of $Rb_2CO_3$;
(b) 50.44 mol % of $Li_2CO_3$, 46.56 mol % of $Na_2CO_3$ and 3 mol % $Cs_2CO_3$;
(c) 50.96 mol % of $Li_2CO_3$, 47.04 mol % of $Na_2CO_3$ and 2 mol % of $Bi_2O_3$;
(d) 50.44 mol % of $Li_2CO_3$, 46.56 mol % of $Na_2CO_3$, 1.5 mol % of $Cs_2CO_3$ and 1.5 mol % of $BaCO_3$; and;
(e) 50.96 mol % of $Li_2CO_3$, 47.04 mol % of $Na_2CO_3$ and 2 mol % of $Ta_2O_5$; and
said second carbonate electrolyte comprises a eutectic mixture of 52 mol % of $Li_2CO_3$ and 48 mol % of $Na_2CO_3$.

17. A molten carbonate fuel cell assembly in accordance with claim 13, wherein:
said first carbonate electrolyte of said high-performance carbonate electrolyte comprises between 92 wt % and 99 wt % of said eutectic Li/Na electrolyte doped with said one or more additive materials and between 1 wt % and 8 wt % of said one or more lithium precursors, said doped eutectic Li/Na electrolyte comprises between 92 mol % and 99.5 mol % of said eutectic mixture of 52 mol % $Li_2CO_3$ and 48 mol % $Na_2CO_3$ and between 0.5 mol % and 7 mol % of said one or more additive materials; and
said second carbonate electrolyte comprises said off-eutectic mixture of $Li_2CO_3$ and $Na_2CO_3$ comprising 80 mol % or more of $Li_2CO_3$ and 20 mol % or less of $Na_2CO_3$.

18. A molten carbonate fuel cell assembly in accordance with claim 17, wherein:
said lithium precursor comprises one of LiOH and a mixture of 80-85 mol % of LiOH and 15-20 mol % of $Li_2CO_3$; the eutectic Li/Na carbonate electrolyte doped with one or more additive materials of said first carbonate electrolyte comprises one of:
(a) 50.96 mol % of $Li_2CO_3$, 47.04 mol % of $Na_2CO_3$ and 2 mol % of $Bi_2CO_3$;
(b) 50.44 mol % of $Li_2CO_3$, 46.56 mol % of $Na_2CO_3$, 1.5 mol % of $BaCO_3$ and 1.5 mol % of $Cs_2CO_3$; and
(c) 50.96 mol % of $Li_2CO_3$, 47.04 mol % of $Na_2CO_3$ and 2 mol % of $Ta_2O_5$; and
said second carbonate electrolyte comprises said off-eutectic mixture of $Li_2CO_3$ and $Na_2CO_3$ comprising 80 mol % or more of $Li_2CO_3$ and 20 mol % or less of $Na_2CO_3$.

19. A molten carbonate fuel cell assembly in accordance with claim 12, wherein said second carbonate electrolyte of said high-performance electrolyte has the same composition as the first carbonate electrolyte, and said first and second carbonate electrolytes comprise between 65 wt % and 94 wt % of said eutectic Li/Na electrolyte doped with said one or more additive materials and between 6 wt % and 35 wt % of lithium precursors, said doped eutectic Li/Na electrolyte comprises between 93 mol % and 99.5 mol % of said eutectic mixture of 52 mol % $Li_2CO_3$ and 48 mol % $Na_2CO_3$ and between 0.5 mol % and 7 mol % of said one or more additives.

20. A molten carbonate fuel cell assembly in accordance with claim 11, wherein said cathode stores therein at least 90 wt % of said first carbonate electrolyte and at least 60 wt % of said total electrolyte, including said first carbonate electrolyte and said second carbonate electrolyte.

21. A molten carbonate fuel cell assembly comprising:
a cathode electrode;
an anode electrode;
an electrolyte matrix disposed between said cathode electrode and said anode electrode; a cathode current collector abutting said cathode electrode; and
a high-performance carbonate electrolyte in accordance with claim 10 stored in said molten carbonate fuel cell assembly, wherein said first carbonate electrolyte is stored in at least said cathode electrode.

22. A molten carbonate fuel cell assembly in accordance with claim 21, wherein:
said mixture of $Li_2CO_3$ and $Na_2CO_3$ is one of a eutectic mixture of 52 mol % of $Li_2CO_3$ and 48 mol % of $Na_2CO_3$ and an off-eutectic mixture having greater than 52 mol % of $Li_2CO_3$; and said one or more lithium precursors comprise one or more of LiOH, $Li_2CO_3$, $LiNO_3$, lithium acetate and lithium oxalate.

23. A molten carbonate fuel cell assembly in accordance with claim 21, wherein said high-perforrnaance carbonate electrolyte further comprises a second carbonate electrolyte stored in a portion of said molten carbonate fuel cell other than said cathode electrode, said second carbonate electrolyte having a composition that is the same or different from the first carbonate electrolyte.

24. A molten carbonate fuel cell assembly in accordance with claim 23, wherein said cathode stores therein at least 90 wt % of said first carbonate electrolyte and at least 60 wt % of said total electrolyte, including said first carbonate electrolyte and said second carbonate electrolyte.

25. A high-performance carbonate electrolyte for use in a molten carbonate fuel cell, said high-performance carbonate electrolyte comprising a first carbonate electrolyte comprising mixture of $Li_2CO_3$ and $Na_2CO_3$ doped with one or more additive materials and one or more lithium precursors, wherein said additive materials include one or more of $Bi_2O_3$, $Ta_2O_5$ and a mixture of Ba and Cs.

26. A high-performance carbonate electrolyte in accordance with claim 25, wherein:
said mixture of $Li_2CO_3$ and $Na_2CO_3$ is one of a eutectic mixture of 52 mol % of $Li_2CO_3$ and 48 mol % of $Na_2CO_3$ and an off-eutectic mixture having greater than 52 mol % of $Li_2CO_3$ and
said one or more lithium precursors comprise one or more of LiOH, $Li_2CO_3$, $LiNO_3$, lithium acetate and lithium oxalate.

27. A high-performance carbonate electrolyte in accordance with claim 25, wherein said first carbonate electrolyte is adapted to be stored in at least a cathode electrode of said molten carbonate fuel cell and said high-performance carbonate electrolyte further comprising a second carbonate electrolyte adapted to be stored in a portion of said molten carbonate fuel cell other than said cathode electrode, said second carbonate electrolyte having a composition that is the same or different from the first carbonate electrolyte.

28. A high-performance carbonate electrolyte in accordance with claim 27, wherein at least 90 wt % of said first carbonate electrolyte is stored in said cathode electrode and at least 60 wt % of said total electrolyte, including said first carbonate electrolyte and said second carbonate electrolyte, is stored in said cathode electrode.

29. A method of manufacturing a molten carbonate fuel cell assembly with a high-performance carbonate electrolyte, said molten carbonate fuel cell assembly comprising a cathode electrode, an anode electrode, an electrolyte matrix, at least a cathode current collector abutting said cathode electrode, and said method comprising:
forming a first carbonate electrolyte by mixing a first predetermined amount of eutectic Li/Na carbonate electrolyte doped with a second predetermined amount of one or more additive materials, with a third predetermined amount of one or more lithium precursors, wherein said additive materials include one or more of $Rb_2CO_3$, $Cs_2CO_3$, $BaCO_3$, $La_2O_3$, $Bi_2O_3$, $Ta_2O_5$ and mixtures thereof;
storing said first carbonate electrolyte in at least said cathode electrode of said molten carbonate fuel cell assembly;
forming a second carbonate electrolyte having a composition that is the same or different from said first carbonate electrolyte; and
storing said second carbonate electrolyte in at least said cathode current collector of said molten carbonate fuel cell assembly.

30. A method of manufacturing a molten carbonate fuel cell assembly with a high-performance carbonate electrolyte in accordance with claim 29, wherein said one or more lithium precursors comprise one or more of LiOH, $Li_2CO_3$, $LiNO_3$, lithium acetate and lithium oxalate.

31. A method of manufacturing a molten carbonate fuel cell assembly with a high-performance carbonate electrolyte in accordance with claim 30, wherein said second carbonate electrolyte has a different composition from the first carbonate electrolyte and forming said second carbonate electrolyte comprises providing one of a eutectic mixture of $Li_2CO_3$ and $Na_2CO_3$ and an off-eutectic mixture of $Li_2CO_3$ and $Na_2CO_3$.

32. A method of manufacturing a molten carbonate fuel cell assembly with a high-performance carbonate electrolyte in accordance with claim 31, wherein:
said first predetermined amount of eutectic Li/Na electrolyte doped with one or more additive materials is between 65 wt % and 85 wt % of first carbonate electrolyte, said second predetermined amount of said one or more additive materials is between 0.5 mol % and 7 mol % of said eutectic Li/Na electrolyte doped with one or more additive materials and said third predetermined amount of said one or more lithium precursors is between 15 % and 35 wt % of said first carbonate electrolyte; and
said forming said second carbonate electrolyte comprises providing said eutectic mixture of $Li_2CO_3$ and $Na_2CO_3$.

33. A method of manufacturing a molten carbonate fuel cell assembly with a high-performance carbonate electrolyte in accordance with claim 31, wherein:
said first predetermined amount of eutectic Li/Na electrolyte doped with one or more additive materials is between 92 wt % and 99 wt % of first carbonate electrolyte, said second predetermined amount of said one or more additive materials is between 0.5 mol % and 7 mol % of said eutectic Li/Na electrolyte doped with one or more additive materials and said third predetermined amount more of said one or lithium precursors is between 1 wt % and 8 wt % of said first carbonate electrolyte; and
said forming said second carbonate electrolyte comprises providing said off-eutectic mixture of $Li_2CO_3$ and $Na_2CO_3$ comprising 80 mol % or more of $Li_2CO_3$ and 20 mol % or less of $Na_2CO_3$.

34. A method of manufacturing a molten carbonate fuel cell assembly with a high-performance carbonate electrolyte in accordance with claim 30, wherein:
said second carbonate electrolyte, has the same composition as the first carbonate electrolyte, and
said first predetermined amount of eutectic Li/Na electrolyte doped with one or more additive materials is between 65 wt % and 94 wt % of first, carbonate electrolyte, said second predetermined amount of said one or more additive materials is between 0.5 mol % and 7 mol % of said eutectic Li/Na electrolyte doped with one or more additive materials and said third predetermined amount of said one or more lithium precursors is between 6 wt % and 34 wt % of said first carbonate electrolyte.

35. A method of manufacturing a molten carbonate fuel cell assembly with a high-performance carbonate electrolyte, said molten carbonate fuel cell assembly comprising a cathode electrode, an anode electrode, an electrolyte matrix, at least a cathode current collector abutting said cathode electrode, and said method comprising:
  forming a first carbonate electrolyte by mixing a first predetermined amount of Li/Na carbonate electrolyte doped with a second predetermined amount of one or more additive materials, with a third predetermined amount of one or more lithium precursors, wherein said additive materials include one or more of $Bi_2O_3$, $Ta_2O_5$ and a mixture of Ba and Cs; and
  storing said first carbonate electrolyte in at least said cathode electrode of said molten carbonate fuel cell assembly.

36. A method of manufacturing a molten carbonate fuel cell assembly with a high-performance carbonate electrolyte in accordance with claim 35, wherein;
  said mixture of $Li_2CO_3$ and $Na_2CO_3$ is one of a eutectic mixture of 52 mol % of $Li_2CO_3$ and 48 mol % of $Na_2CO_3$ and an off-eutectic mixture having greater than 52 mol % of $Li_2CO_3$; and
  said one or more lithium precursors comprise one or more of LiOH, $Li_2CO_3$, $LiNO_3$, lithium acetate and lithium oxalate.

37. A method of manufacturing a molten carbonate fuel cell assembly with a high-performance carbonate electrolyte in accordance with claim 35, further comprising:
  forming a second carbonate electrolyte having a composition that is the same or different form said first carbonate electrolyte; and
  storing said second carbonate electrolyte in at least said cathode current collector.

38. A high-performance carbonate electrolyte for use in a molten carbonate fuel cell comprising a cathode electrode, an anode electrode, an electrolyte matrix and at least a cathode current collector abutting said cathode electrode, said high-performance carbonate electrolyte comprising:
  a first carbonate electrolyte stored in the cathode electrode of the molten carbonate fuel cell comprising a mixture of Li/Na carbonate electrolyte doped with one or more additive materials and one or more lithium precursors, wherein said additive materials include one or more of $Rb_2CO_3$, $Cs_2CO_3$, $BaCO_3$, $La_2O_3$, $Bi_2O_3$, $Ta_2O_5$ and mixtures thereof; and
  a second carbonate electrolyte stored in said cathode current collector, said second carbonate electrolyte comprising a mixture of Li/Na carbonate electrolyte,
  wherein the cathode current collector does not store therein any electrolyte doped with the one or more additive materials.

39. A molten carbonate fuel cell assembly comprising:
  a cathode electrode;
  an, anode electrode;
  an electrolyte matrix disposed between said cathode electrode and said anode electrode;
  a cathode current collector abutting said cathode electrode; and
  a high-performance carbonate electrolyte in accordance with claim 38, wherein said first carbonate electrolyte is stored in said cathode electrode and said second carbonate electrolyte is stored in said cathode current collector.

* * * * *